Nov. 27, 1956   T. A. STRÖMBERG ET AL   2,771,684
IMPROVEMENTS IN MEASURING INSTRUMENTS
Filed Dec. 18, 1952   2 Sheets-Sheet 1

United States Patent Office 2,771,684
Patented Nov. 27, 1956

2,771,684

IMPROVEMENTS IN MEASURING INSTRUMENTS

Tage Alfred Strömberg and Karl Gustav Lennart Hansson, Stockholm, Sweden

Application December 18, 1952, Serial No. 326,674

Claims priority, application Sweden July 28, 1952

3 Claims. (Cl. 33—172)

The present invention relates to a test indicator adapted for testing the size of articles, for instance, or for ascertaining whether the work of a lathe is running true, and comprises a measuring cylinder and a section of flexible metal band, one end of which section is connected to the measuring rod and its other end to a drum which is rotatable in the casing and is in driving connection with one or two pointers, and furthermore comprising a spring device keeping the metal band stretched. The main feature of the invention is that the spring device consists of a flat spring or the like having one end thereof secured to the casing of the test indicator, while its other free end carries a swingably mounted eccentric sheave, on the periphery of which two approximately diametrically opposed sections of metal band are fixed with their one end at different distances from the axis line of the eccentric sheave and with their other end to the drum and the measuring cylinder respectively. Preferably, the attachments of the two sections of metal band secured to the measuring rod consist of a common U-shaped carrier member which is mounted on the measuring rod so as to be axially displaceable when the latter is rotated and against the inner face of one shank of which two washers threaded on to the measuring rod press under the influence of a spring provided within the carrier member. It is furthermore preferred to provide on the periphery of the drum two mutually parallel flanges of smaller width than the metal bands secured to the drum and to have the metal bands contacting the drum only along the peripheries of the flanges.

Due to the band transmission according to the invention a great accuracy of measurement is made possible and the test indicator will have a long life. Besides serving as a guard and a shock absorber for the various driven means of the test indicator, the band transmission according to the invention forms a measuring power compensator, that is, the measuring capacity of the test indicator is practically constant all over the measuring range of the indicator. The carrier member according to the invention allows a quick zeroizing of the indicator pointers, and the two spring-actuated washers provided within the carrier member effect a balanced rigid, playless rotation of the measuring rod for which reason the zeroizing guards or zeroizing locks used in the known, commonly sold test indicators with rack transmission are dispensed with.

The accompanying drawings are illustrating an embodiment of the invention.

Figure 1:
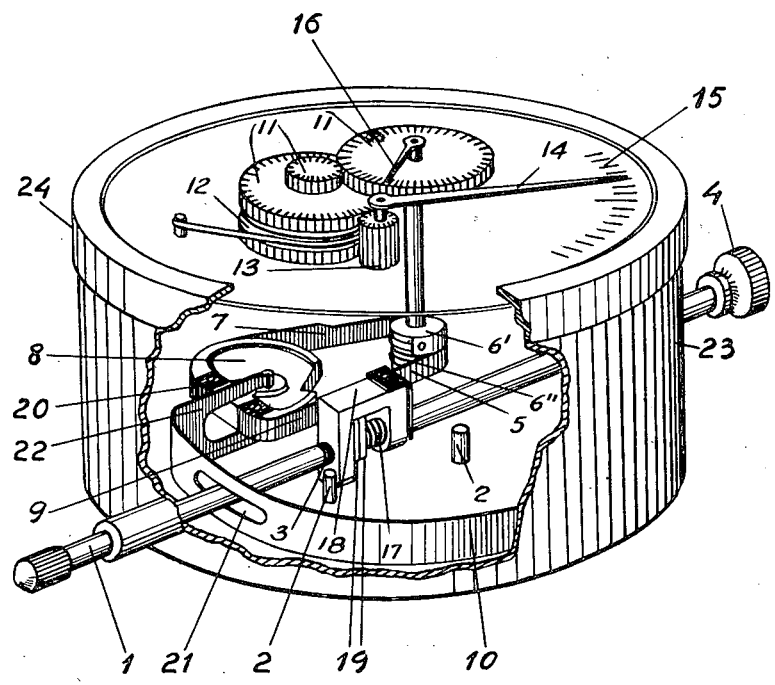
Fig. 1 is a diagrammatical, enlarged perspective view of a test indicator according to the invention. A part of the casing wall of the test indicator is broken away.

Referring now to the drawings, the numeral 23 designates a test indicator casing with integral bottom and a detachable cover, 1 is a measuring rod, the free, pointed end of which is to contact the object to be checked and 5 is a section of flexible metal band. One end of band section 5 is connected to the measuring rod 1 and its other end is connected to a drum 6′, 6″ which is rotatably mounted in the casing 23 and is in turn in driving connection with two pointers 14, 16 (Fig. 1) so that, during measuring, the metal band section 5 forms a band transmission. This band transmission will serve as a shock absorber for protecting the already known driving means 11—13 of the test indicator against injury and excessive fluctuations even when rod 1 is subjected to reasonably heavy shocks. The pointer operating means, of known construction, comprises a set of pinions 11 for driving pointers 14 and 16. If the measuring rod 1 is subjected to extraordinarily heavy shocks, the metal band section 5 may of course break, in which case the pointers will be left undriven, but neither the pointers nor their gears 11 (Fig. 1) will suffer any damage. The numeral 2 designates two stationary stops mounted on the casing to limit the movement of the measuring rod 1 between two extreme positions and thus define the measuring range.

Figure 2:
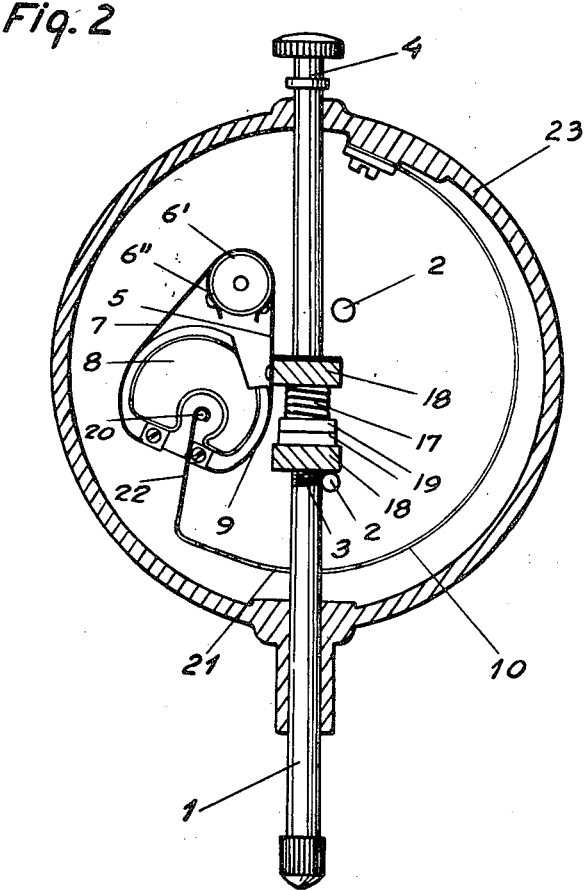
Fig. 2 shows the same test indicator with the cover, pointers and pinions removed
Figure 3:
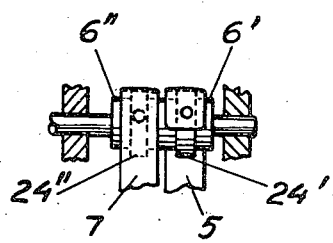
Fig. 3 shows on an enlarged scale a drum with two band attachments and two contact places according to the invention.

A spring device for keeping the metal band section 5 normally stretched during measuring consists of a flat spring 10, one end of which is secured to the inside of the casing 23, while its other end carries a swingably mounted eccentric sheave 8. Two sections of metal band 7, 9 have one end secured to the periphery of the eccentric sheave at points approximately diametrically opposite one another and at different distances from the axis of said sheave at 20, their other ends being secured to the drum 6″ and the measuring rod 1 respectively. For the sake of clarity, the two parts 6′ and 6″ of the drum are shown as having different diameters in Fig. 2, but it is better in practice to give the said drum parts 6′, 6″ the same diameter. Besides, as shown in Fig. 3, those parts may be provided with mutually parallel flanges 24′, 24″ of smaller width than the metal band sections 5 and 7 which are secured to the drum parts 6′, 6″. Thus, the metal bands will rest against the drum 6′, 6″ only along the periphery of the flanges so that the metal band sections 5, 7, which are also laterally flexible, have an effective contact surface of reduced area on the drum so as to reduce friction. In respect of friction, this arrangement is better than a completely plane band contact against a relatively broad cylindrical drum surface.

In the shown embodiment the attachments of the two metal band sections 5, 9 on the measuring rod 1 are constituted by a common, U-formed carrier or driver member 18. This carrier member 18 is freely mounted and axially slidable on a threaded central part of the measuring rod 1. Two adjustment nuts 19 are screw-threadedly mounted on the central threaded portion 3 of rod 1 and these nuts have flat edge portions which bear against the inner portion of the U-shaped driver member 18 and prevent turning of said nuts. Between said nuts 19 and one leg of the U-shaped driver is a coil-type spring 17 encircling the rod 1, and bearing with its ends against one of nuts 19 and the said leg of the driver, thus keeping the other leg of the driver pressed against the other nut 19. For zeroizing the indicating mechanism, the rod 1 can be turned by knob 4 so as to screw-threadedly adjust the longitudinal position of rod 1 relative to the nuts 19. By the provision of two nuts 19, instead of a single nut, a greater resistance to turning of the rod 1 is attained, this providing sufficient stability of the adjustment of rod 1. 15 designates a stationary scale for the pointer 14 on the top side of the cover 24. The spring 10 is provided with an aperture 21 for the measuring rod 1 so that said spring can move freely during measuring. It is furthermore provided with a bifurcated inner, free end portion 22, the outer parts of which are bent to form a bearing for the shaft pivots 20 of the eccentric sheave 8. The band sections 7, 9, one end of which is mounted as described above on the periphery of the eccentric sheave 8 at different distances from the axis of said sheave at 20 while their other end is secured to the drum part 6" and the carrier member 18 respectively, have the effect that, due to its greater lever effect the metal band section 7 will serve as a force equalizing band for the change in force which is inevitable when the spring 10 changes its position.

Of course, the details or parts described above may be otherwise designed without abandoning the spirit of the invention.

We claim:

1. A test indicator comprising a casing, pointer means, a rotatable drum, means connecting said pointer means to said drum to be driven thereby, a measuring rod, and a section of flexible metal band having one end thereof connected to the said measuring rod and the other end connected to said drum, a spring device keeping said section of metal band stretched, said spring device comprising a leaf spring having one end secured to said test indicator casing, a swingably mounted eccentric sheave carried at the other end of said spring, two sections of metal band secured at one end thereof to said sheave at approximately diametrically opposed points on said sheave at different distances from the axis thereof, the other end of said latter sections of metal band being secured to said drum and connected to said measuring rod respectively.

2. A test indicator according to claim 1 and in which the means connecting the two sections of metal band to the measuring rod comprises a common, U-shaped carrier member which is mounted on the measuring rod and is axially displaceable relative thereto, by the rotation of said rod, said test indicator further comprising two nuts threaded on said measuring rod and a spring within said carrier member, pressing said nuts against the inner surface of one of the shanks of said carrier member.

3. A test indicator according to claim 1, and in which said drum is provided on the periphery thereof with two mutually parallel flanges of a smaller width than the sections of metal band secured to said drum, the sections of metal band contacting the drum only at the peripheries of said flanges.

References Cited in the file of this patent

UNITED STATES PATENTS

| 1,506,954 | Taylor | Sept. 2, 1924 |
| 2,658,282 | Nemecky | Nov. 10, 1953 |

FOREIGN PATENTS

| 121,768 | Sweden | May 2, 1951 |